UNITED STATES PATENT OFFICE 2,288,605

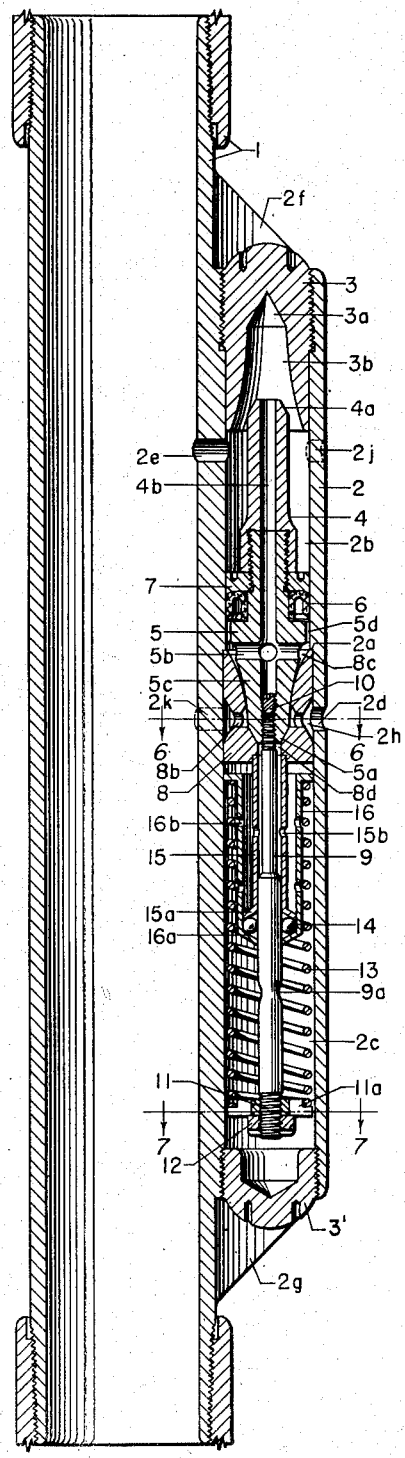
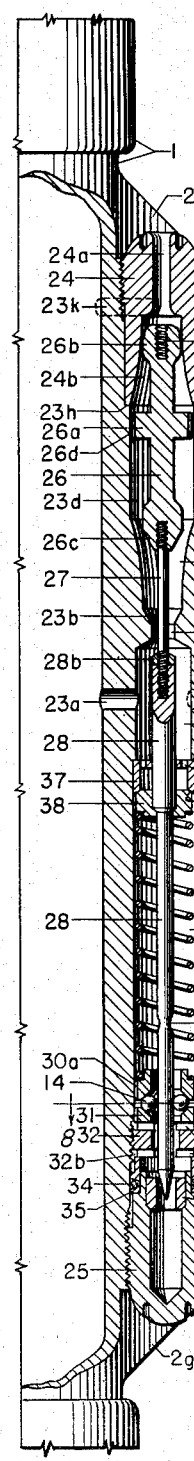
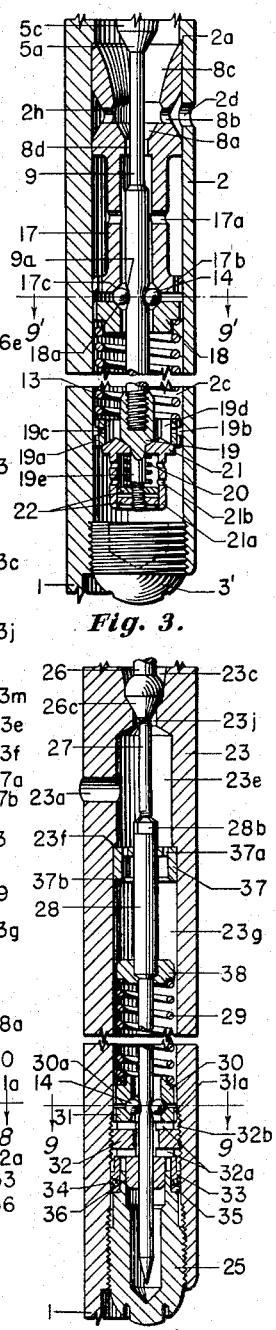
Fig. 1. Fig. 2. Fig. 3. Fig. 4.
ALEXANDER BOYNTON, INVENTOR,
BY Jesse R. Stone
Luther B. Clark
ATTORNEYS.

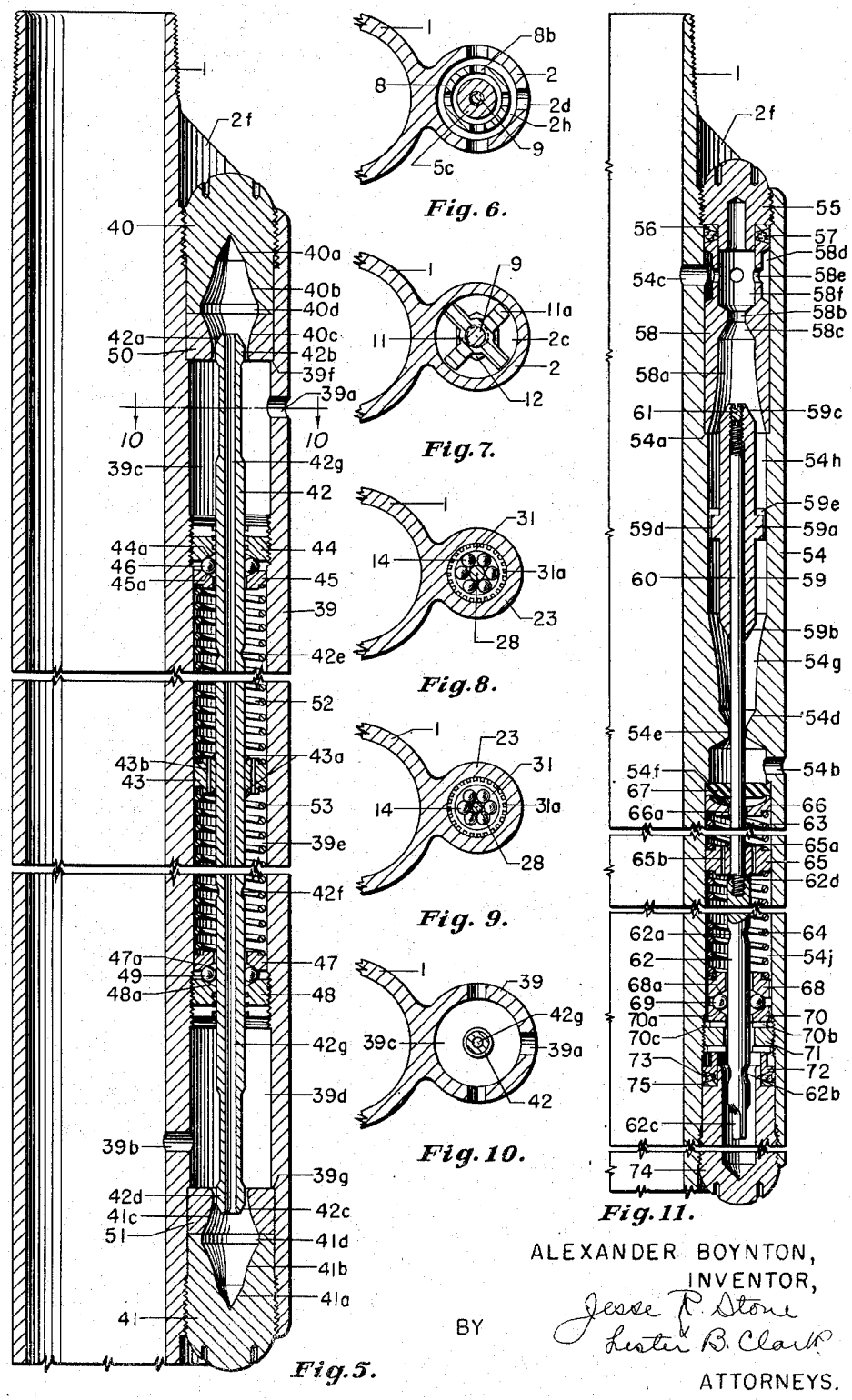

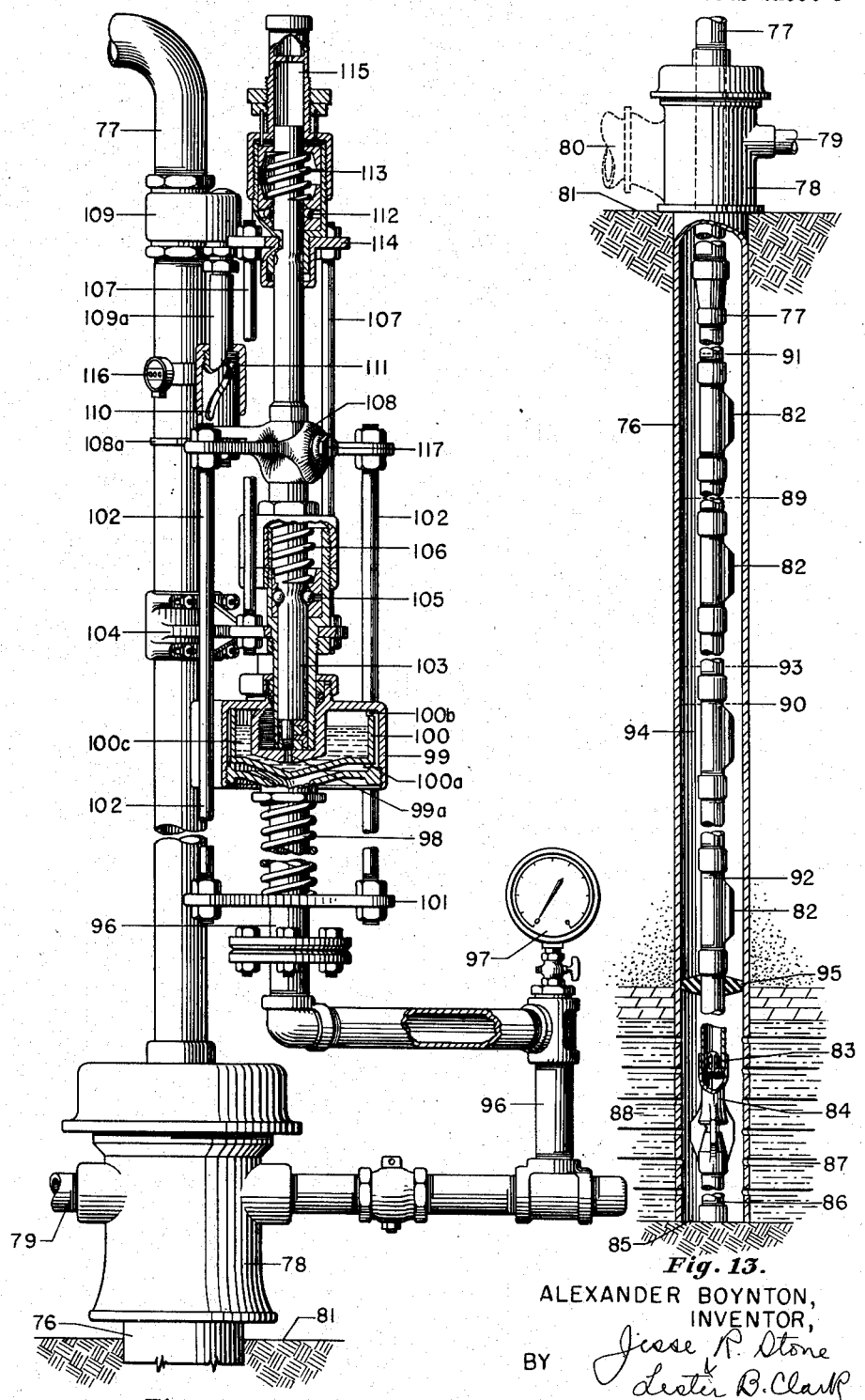

DIFFERENTIAL FLOW DEVICE WITH VALVE CONTROLLING MEANS

Alexander Boynton, San Antonio, Tex.

Application December 8, 1939, Serial No. 308,316

16 Claims. (Cl. 137—111)

My invention relates to differential stage lift flow devices for expelling liquids from wells, more especially oil wells.

The principal object is to provide a valve in combination with gas metering means and a latch to prevent the valve from fluttering and being forced open by slugs of well liquid.

Another object is to provide a means for holding the valve seated independently of the differential force.

Another object is to cause the differential valve seating force to act upon an area larger than that of the valve.

In accomplishing these and other objects, I employ a piston of relatively large diameter to operate a spring-loaded valve of less diameter in combination with a lubricated latch and a check valve, as will be clearly understood from the following specification and accompanying drawings in which—

Fig. 1 is a longitudinal section through the preferred embodiment for tubing flow.

Fig. 2 is a longitudinal section through a modified form for tubing flow, showing the valve open and the latch disengaged.

Fig. 3 is a longitudinal section through a portion of a modification of the construction shown in Fig. 1.

Fig. 4 is a longitudinal section of a portion of the device illustrated in Fig. 2, showing the valve closed and the latch engaged.

Fig. 5 is a longitudinal section through a modified form of the invention adapted for either tubing or casing flow.

Fig. 6 is a cross section on the line 6—6, Fig. 1.

Fig. 7 is a cross section on the line 7—7, Fig. 1.

Fig. 8 is a cross section on the line 8—8, Fig. 2.

Fig. 9 is a cross section on the line 9—9, Fig. 4.

Fig. 10 is a cross section on the line 10—10, Fig. 5.

Fig. 11 is a longitudinal section of another modified form adapted for either tubing or casing flow.

Fig. 12 is a partial installation plan showing the upper end of a well with a flow intermitter.

Fig. 13, showing the devices installed in a well, extends downward from the showing in Fig. 12, and completes the installation plan.

Similar characters of reference are employed to designate similar parts throughout the several views.

The column of well liquid caused to stand up in the eduction tube in balance against the pressure fluid, whether in the tubing or in the casing (depending upon the path of flow) will be referred to as the upstanding column.

The difference between the force of the pressure fluid and the force exerted by the upstanding column will be referred to as the differential.

The valve controlling the admission of pressure fluid into the upstanding column will be designated as the pressure fluid valve.

The parts 4 to 8, both inclusive, will be referred to as the movable piston assembly.

Three forces are manifested in the operation of this device. The pressure fluid exerts one constant force, and the spring exerts the other; while the pressure of the upstanding column is the only variable force.

Referring to Fig. 1, showing a device for tubing flow, the nipple 1, adapted to be threadedly connected into the well tubing, has a lateral shell 2 which may be cast integrally with it. This shell, having the upper guide slope 2f and the lower guide slope 2g, has its upper end hermetically closed by the plug 3 and its lower end hermetically closed by the plug 3'. The member 8 may be pressed into the chamber 2c and landed upon the shoulder 2a.

The piston base 5, having the central opening 4b and the cross bores 5b, has an external annular shoulder upon which the U cup 6 is secured by the ring 7. This ring has threaded engagement over the upper extremity of the member 5 where it may be locked in position to properly engage the U cup by the valve member 4, likewise having threaded engagement with the upper extremity of the member 5.

The latch rod 9, having threaded engagement within the lower extremity of the member 5, has a winged nut 11 threadedly engaged over its lower extremity and locked by the nut 12. The coiled spring 13, having slight clearance within the chamber 2c and over the member 16, is installed under some compression between the wings 11a of the nut 11, having end clearance within the chamber 2c, and an external annular flange at the upper extremity of the member 16.

The latch roof member 15, having its upper end landed centrally under the member 8, has its inclined ball roof 15a engaged upon the latch balls 14 supported upon the ball floor 16a. The ball roof and floor constantly urge the latch balls inwardly by the expansive force of the spring 13. This spring also causes the valve 5a normally to engage yieldably upon the seat 8a, while the valve 4a is also normally somewhat within the lower portion of the metering chamber 3b.

When the movable piston assembly is urged upwardly by sufficient differential, the valve 4b will land upon the seat 3a and the latch balls will engage within the annular recess 9a (see Fig. 3).

It will be noted that there is some clearance between the upper end of the member 16 and the member 8, in order that the full force of the spring 13 constantly will urge the downwardly inclined latch floor 16a toward the upwardly inclined latch roof 15a, which inclined surfaces constantly tend to force the latch balls inwardly.

When the valve 4a is engaged upon its seat 3a, the latch balls should engage upon the upper portion of the latching surface 9a, as appears in Fig. 3, in order that the valve 4a will be firmly seated by the latch force while the latch is engaged. The rod 9 may be screwed inwardly or outwardly within the member 8 to obtain such adjustment which may be secured by the lock plug 10.

The chamber 2c may be filled with a viscous liquid such as castor oil and graphite or ground lead and oil. The normal seating of the valve 5a upon its seat within the member 8 will prevent the liquid within the chamber 2c from leaking out before the devices are installed. The slight clearance 8d, between the rod 9 and the member 8, and the lateral openings 15b and 16b of the members 15 and 16, respectively, enable the rod 9 to be raised without tending to pull a vacuum within the chamber 2c and to be lowered without becoming impinged upon the liquid within that chamber.

The path of the pressure fluid through the device is through the external lateral opening 2d; thence via the chamber 2h, the openings 8b, the lower metering chamber 8c, the cross bores 5b, the passage 4b, the upper metering chamber 3b, and out into the tubing through the lateral opening 2e. As the movable piston assembly rises, the U cup 6 will be expanded against the polished wall of the chamber 2b by pressure fluid entering through the small slots 5d.

The central enlargement of the piston base 5, the U cup 6, and the ring 7 have a close sliding fit within the chamber 2b. The lower enlarged portion of the rod 9 is, likewise, closely slidable within the member 15 and through the latch floor 16a.

During the upward movement of the movable valve assembly, it is evident that the lower extremity 5c of the member 5 will throttle the flow of pressure fluid through the metering chamber 8c until the valve member 4 assumes a similar function within the metering chamber 3b, thus controlling the flow of pressure fluid through the device in such manner as to permit the greatest flow thereof at any desired differential, depending upon the relative lengths of the two metering chambers which, of course, may be different. Increasing or decreasing the differential at which the pressure fluid valve will close also will change the volume of pressure fluid discharged through the device approximately in proportion to such increase or decrease in the valve closing differential.

The intake and discharge openings 2d and 2e should be much larger than the openings 4b and 5b through the movable piston assembly. This is so because the differential which actuates the pressure fluid valve is created by the comparatively restricted opening through the members 4 and 5. The requirement for relatively large intake and discharge openings also applies to the constructions illustrated in Figs. 2, 5, and 11, but will not be repeated in connection with the embodiments therein shown.

In Fig. 3, illustrating a modified form, also adapted for tubing flow, a check valve is employed in combination with the latch shown in Fig. 1. The latch will hold the valve 4a (not shown, but the same as in Fig. 1) seated against a predetermined differential. When the latch releases, the check valve will cause the pressure fluid valve 4a to open slowly by impeding the movement of the viscous liquid within the chamber 2c; and herein resides one of the most important features of this invention.

The valve seat member 17, having its upper portion formed the same as the member 8 in Fig. 1, may be pressed into the shell 2 and landed upon the small internal shoulder 2a. The lower portion has the openings 17a and 17b to allow for free movement of the viscous liquid into and out of the chamber 2c as the rod 9 moves upward and downward. The lower end of the member 17 has the inclined surface 17c co-acting with the inclined surface 18a of the member 18, slidable within the chamber 2c. These inclined surfaces urge the latch balls 14 against the rod 9, having the latching surface 9a (Fig. 1) within which the balls engage when the valve 4a is closed upon its seat 3a, as was explained for Fig. 1.

The lower end of the shaft 9 has threaded engagement with the check valve base 19, having the longitudinal peripheral slots 19a, the peripheral recess 19b, the lateral openings 19c, the longitudinal openings 19d, and the depending shank 19e. Over this shank the coiled spring 20 is installed under slight compression between the check valve 21 and the nuts 22, and normally urges the valve 21 to seat resiliently upon the nether side of the member 19, slidable within the chamber 2c.

The valve 21 has a depending tubular shell 21a, having the lateral openings 21b for circulation of fluid as the check valve opens and closes. This shell is slidable over the nuts 22 which guide it truly to seat the valve.

The pressure fluid valve may close quickly upon its seat 3a because the check valve 21 will open to allow free fluid passage through the openings 19d as the base 19 is raised. The pressure fluid valve will open slowly after the latch springs, because the check valve 21 will remain closed then; thereby forcing the liquid under the member 19 through the small slots 19a.

Parts shown in Fig. 3 which bear the same reference characters as the similar parts in Fig. 1 will be understood to be similar in construction and purpose to those there shown.

In Fig. 2, illustrating another modification of the invention for tubing flow, the plunger 26 has a central portion of enlarged diameter 26a closely slidable within the chamber 23d. This enlargement has the small longitudinal peripheral slots 26d through which the pressure fluid flows. The member 26 has its lower end formed into the valve 26c adapted to close upon the seat 23b, and having slight clearance within the lower end of the upwardly flared metering chamber 23c. The head 26b has slight clearance within the upper portion of the downwardly flared metering chamber 24b and is positioned normally proximate the upper end of the chamber 24b; while the valve 26c is slightly within the chamber 23e. The chamber 23d is of such length that the enlargement 26a will stop some distance above the upper end of the chamber 23c when the valve 26c engages its seat 23b. The threaded opening 26e is for a testing tool employed to adjust the setting of the latch in assembling.

The rod 27, having comparatively large clearance within the opening 23j, has threaded connection with the plunger 26 and with the latch rod 28. The lock nut 28b affords means for securing the latch adjustment by locking the threaded engagement between the members 27 and 28. The latch may be also adjusted by screwing the member 32 upward or downward.

The valve travel spacer ring 37, having the openings 37a, may be pressed into the chamber 23g and landed upon the slight internal annular shoulder 23f. This ring has a central opening through which the rod 28 is freely slidable. The valve member 38, having large clearance within the chamber 23g, has its upper outer surface formed into a valve adapted to engage the seat 37b of the member 37. The central opening through the member 38 has an internal annular flange engageable with the upper enlarged portion of the rod 28, by which engagement the spring 29, having slight clearance within the chamber 23g, is compressed on the downward stroke of this rod, as appears in Fig. 4, which illustrates the valve 26c of Fig. 2 seated and the latch engaged.

The latch base ring 32 has threaded engagement within the lower portion of the shell 23 and supports the ball floor 31, having an inclined upper surface engaging the balls 14. The ball roof 30, having an inclined lower surface engaging the latch balls, is urged downward by the coiled spring 29, installed under some compression in Fig. 2, and compressible as shown in Fig. 4. The inclined surfaces of the members 30 and 31 are adapted to urge the latch balls inwardly to contact the rod 28. When the plunger 26 is in its normal position unmoved by the differential, the latch is disengaged, as in Fig. 2. When the pressure fluid valve 26c is seated, the latch balls are engaged upon the latching surface 28a, as in Fig. 4.

The intake bushing 24, having the intake opening 24a and the metering chamber 24b, is threadedly engaged within the upper end of the shell 23 and landed upon the internal annular shoulder 23h.

The chamber 23g has its lower end hermetically closed by the plug 25 engaging the gland ring 35, which has slight clearance within the shell 23, upon the packing 34. The gland base 33, also having slight clearance within the shell 23, is engaged between the packing and the latch base ring 32.

The ring 36, supported by an annular shoulder within the plug 25, has slight clearance within the plug and over the lower portion of the rod 28. This ring acts as a brake to cause the valve 26c to move slowly away from its seat 23b after the latch springs, but offers no resistance to the seating of this valve. This is true because on the downward stroke of the valve 26c the ring 36 will be floated freely upward by the displaced liquid below it within the plug 25 as the rod 28 moves downward through it, as appears in Fig. 4. On the unseating stroke of the valve 26c, the ring 36 will be drawn downward by the liquid above it, attempting to replace the displacement of the rod 28, as it is withdrawn. The slight clearance between this ring and the rod causes such replacement to be accomplished slowly. Thus a brake is provided to slow down the opening movement of the pressure fluid valve. This brake action prevents the valve 26c from vibrating and fluttering after the latch springs.

The chamber 23g may be filled with a viscous liquid such as castor oil and graphite or ground lead and oil. The clearance between the valve member 38 and the wall of the chamber 23g, the openings 37a, the peripheral slots 30a and 31a, the cross slots 32a, the annular recess 32b, and the clearance of the members 30, 31, and 32, with the rod 28, provide that the liquid within the chamber 23g may circulate responsive to the movements of the rod 28.

The path of the presure fluid through the device is via the intake opening 24a, the clearance around the plunger head 26, the peripheral slots 26d, the chambers 23d and 23c, the opening 23j, the chamber 23e, and the lateral opening 23a, from which it enters the upstanding column of well liquid in the tubing.

It will be observed in Fig. 2 that the head 26b is positioned normally proximate the upper end of the metering chamber 24b and that the lower enlargement, having its lower end formed into the valve 26c, is positioned normally proximate the upper end of the metering chamber 23c. The clearance around the head 26b will increase, and the clearance around the lower enlargement will decrease as the valve 26c approaches its seat 23b. In this manner, the greatest volume of pressure fluid will be discharged through the device at approximately one-half of the differential required to seat the valve 26c. Obviously, the differential at which the device will allow the greatest volume of pressure fluid to pass through it may be varied by varying the relative lengths of the two metering chambers, as stated in connection with Fig. 1. Varying the differential at which the pressure fluid valve 26c will close will also, in a large degree, proportionately vary the volume of pressure fluid passing through the device, as will be understood by those skilled in the art.

It is apparent that the device illustrated in Fig. 1 for tubing flow can be readily adapted for casing flow by closing the lateral openings 2e and 2d and providing the opening 2j, opposite from the opening 2e, and the opening 2k, opposite from the opening 2d.

The device shown in Fig. 2 for tubing flow also can be adapted for casing flow by closing the openings 24a and 23a and providing in their place the openings 23k and 23m.

In Fig. 5, which illustrates the invention adapted to both tubing and casing flow, the nipple 1 may be joined threadedly into the well tubing. This nipple has the lateral shell 39, hermetically closed at its upper end by the plug 40, having formed within it the metering chamber 40b, and hermetically closed at its lower end by the plug 41, having the metering chamber 41b formed within it. Preferably, both nipple and shell may be cast integrally.

The valve tube 42 is slidable closely within the members 44 and 48 and is slidable loosely within the members 45 and 47. The spring compression ring 43, which may be pressed over and secured upon the tube 42 by the welds 43a, has slight clearance within the chamber 39e.

The upper ball roof 44, having its nether side formed to the sloping surface 44a, may be joined threadedly into the chamber 39e. The ball floor 45, having its upper side formed to the sloping surface 45a, is slidable within the chamber 39e. The latch balls 46 are urged inwardly by the sloping surfaces 44a and 45a, co-acting with the expansive force of the coiled spring 52, installed under some compression between the members 43 and 45.

The lower ball floor 48, having its upper side formed to the sloping surface 48a, may be threadedly secured within the upper end of the chamber 39d. The lower ball roof 47, having its lower side formed to the sloping surface 47a, has clearance within the chamber 39e and is engaged upon the lower latch balls 49 by the force of the coiled spring 53, installed under some compression between the members 43 and 47. The sloping surfaces 47a and 48a urge the latch balls inwardly against the tube 42 by force of the spring 53.

The upper latching surface 42e is adapted to be engaged by the upper latch balls 46 when the upper valve 42a is closed upon the seat 40a. The lower latching surface 42f is adapted to be engaged by the lower latch balls 49 when the valve 42c is closed upon the seat 41a. The valves 42a and 42c will engage their respective seats at a predetermined differential and the latches will release the tube 42 at a pre-determined lesser differential, or th latches may be adjusted to release at different differentials by varying the depth of engagement of the latch balls with the surfaces 42e and 42f. This depth of engagement may be adjusted by screwing the members 44 and 48 upwardly or downwardly, as is apparent.

The chamber 39e may be filled with a viscous lubricant to lubricate the latch and to slow down the valve travel when the latch springs. The openings 43b will be small if slow valve movement be desired, or these openings will be large if fast valve travel be preferred. This is true, because liquid within the chamber 39e must move through these openings when the tube 42 is actuated in either direction.

The metering chamber sleeve 50 may be pressed into the shell 39 and landed upon the small internal annular shoulder 39f. The metering chamber 40b and 40c may be of the same or different lengths and of the same or different diameters. The straight portion 40d preferably should have the same length as the straight portion of the head 42b.

The metering chamber sleeve 51 may be pressed into the shell 39 and landed upon the small internal annular shoulder 39g. The metering chambers 41b and 41c may be of the same or different lengths and diameters, as was stated for the upper metering chambers. One pair of metering chambers, also, may differ from the other pair in dimensions. The straight portion of the head 42d should be approximately of the same length as that of the straight portion 41d.

The head 42b should be positioned normally within the upper end of the metering chamber 40c with which it has some clearance, and the head 42d should be positioned normally within the upper end of the metering chamber 41c, with which it has some clearance, as appears in Fig. 5.

The head 42b will have increasing clearance within the chamber 40c and decreasing clearance within the chamber 40b as the valve 42a approaches its seat 40a. The head 42d will have increasing clearance within the chamber 41c and decreasing clearance within the chamber 41b as the valve 42c approaches its seat 41a.

In this manner, the greatest volume of pressure fluid will pass through the device at a differential which may be approximately one-half of the differential required to seat either valve 42a or 42c.

In this construction, it will be understood that the differential acts upon either extremity of the tube 42 protruding outwardly of the members 44 and 48.

For tubing flow, the path of the pressure fluid will be into the shell 39 through the lateral openings 39a and thence via the chamber 39c, the metering chambers 40c and 40b, the passage 42g, the metering chambers 41c and 41b, and into the tubing through the lateral opening 39b.

For casing flow, the pressure fluid will take the same path through the device as that above stated for the tubing flow, except the direction will be reversed.

The upper metering chambers 40b and 40c ordinarily should have somewhat greater clearance with the head 42b than the lower metering chambers have with the head 42d. This is true because the upper head 42b and the chambers 40b and 40c control the flow of pressure fluid into the annular space between the tubing and the casing for casing flow; whereas, the head 42d and the lower chambers 41b and 41c control the pressure fluid flow into the tubing for tubing flow.

Fig. 11 illustrates a further modified form of the invention for both tubing and casing flow.

The lateral shell 54 may be cast integrally with the nipple portion 1. The upper end of this shell is closed hermetically by the plug 55 engaging the gland ring 56 upon the packing 57 supported by the upper end of the sleeve 58 which may be pressed into the shell and landed upon the small internal annular shoulder 54a. The interior of the member 58 is formed into the central metering chamber 58a, the passage 58b, and the chamber 58f.

The plunger 59 is engaged threadedly upon the rod 60 and locked by the locking screw 61 in such position as to cause its valve 59c to engage the seat 58c when the latch balls 69 engage upon the lower latching surface 62b, and to cause the valve 59b to engage the seat 54d when the latch balls are engaged upon the upper latching surface 62a.

The central enlargement 59a of the plunger 59 is slidable closely within the chamber 54h and has the peripheral slots 59d to allow pressure fluid to pass.

The latch shaft 62 may be joined threadedly to the rod 60 and secured upon it by the weld 62d. The piston 65 may be pressed over the rod 60 and secured to it by the weld 65a.

The diaphragm 67, which may be of rubber, is engaged between the internal annular shoulder 54f and the circular plate 66 by force of the upper coiled spring 63 installed under some compression between the plate 66 and the piston 65, this latter member being slidable freely within the chamber 54j.

The ball roof 68, having the inclined surface 68a, is engaged upon the latch balls 69 by the force of the lower coiled spring 64 installed under some compression between the members 65 and 68. The ball floor 70, having the inclined surface 70a, rests upon the latch base ring 71.

The inclined surfaces 68a and 70a urge the latch balls inwardly to contact the shaft 62 by the force of the spring 64.

If the latch is to hold with equal force in both directions of the valve travel, the latch should be adjusted so that the balls will engage more deeply upon the surface 62b than upon the surface 62a, because the spring is under greater compression when the valve 59b seats than when the valve 59c is seated.

The lower end of the shell 54 is closed hermetically by the plug 74 engaging upon the gland ring 75, which in turn, compresses the packing 73 upon the other gland ring 72.

The latch balls may be raised or lowered by screwing the ring 71 upward or downward, and the plunger 59 may be raised or lowered by means of its threaded connection with the rod 60, thus providing for all necessary adjustments of the latch. The flattened end 62c of the shaft 62 and the wrench slots 59e upon the plunger enlargement 59a are provided for convenience in making latch adjustments.

The chamber 54j may be filled with a viscous lubricant if it be desired to slow down the valve travel when the latch releases. The openings 65b may be made large or small to regulate further the speed with which the valves will travel. The clearance which the members 68, 70, and 71 have with the shaft 62, and the clearance which the members 68 and 70 have within the chamber 54j provide for free circulation of fluid as the shaft 62 moves upward or downward. The slots 70b and the annular recess 70c are provided also for this purpose and enable the fluid to pass freely between the annular opening exterior of the members 68 and 70 and the annular opening between the shaft 62 and the ring 71.

The diaphragm 67, having a close fit over the rod 60, will flex downwardly to compensate for the outgo of the rod 60 when the valve 59c moves upwardly, and will flex upwardly to compensate for the incoming portion of this rod when the valve 59b moves downwardly. The opening 66a is somewhat larger than the rod 60 in order that the diaphragm 67 may be flexed freely by the fluid under it.

While flowing the well through the tubing, the pressure fluid will enter the device through the lateral opening 54b and be discharged into the tubing through the lateral opening 54c via the intervening passage 54e, the metering chamber 54g, the plunger chamber 54h, the other metering chamber 58a, the central passage 58b, the lateral openings 58e, and the recess 58d.

Either of the embodiments herein shown may be joined into the well tubing at intervals which may vary between 150 and 300 feet. But, however, spaced, the pressure fluid valve should be adjusted so that the per square inch differential force required to close this valve will be approximately equal to twice the force per square inch exerted at the base of a column of well liquid as high as adjacent devices are spaced apart. In this manner, an upper device will be closing while the next one below will be opening, if the power graph developed by the valves and metering chambers is substantially triangular with the two volume legs thereof of approximately equal length, as they preferably should be.

The pressure fluid force employed to flow the well may be somewhat more than two or three times the differential force required to close the pressure fluid valves, depending upon depth and other well conditions.

For tubing flow, it will be assumed that either of the devices shown is connected at proper intervals into the tubing 77 in Fig. 13. The casing head 78 may be employed proximately above the ground surface 81 to affect a hermetic seal between the casing 76 and the tubing 77 into which the flow devices 82 are joined.

The well fluid from the formation 88 enters the annular space 94 through the gun perforations 87. An anchor string of tubing 86 may extend from the intake nipple 84 to the bottom of the well 85.

The normal liquid level is assumed to be at 89. The casing flow pipe 80 is closed and the tubing 77 is open to a flow tank.

If pressure fluid now be turned into the annular space 94 through the pipeline 79, to flow the well through the tubing, the well liquid will be depressed in the casing to a level indicated at 90 and the liquid within the tubing 77 will be caused to rise in balance against the pressure fluid force to a level indicated at 91. The device 82 next to the base of the upstanding liquid column in the tubing will be open and discharging pressure fluid into the tubing. The device next above will be partially open. As the liquid level in the annular space 94 is lowered, the lower devices will open as the upper devices close.

If a packer 95 be installed between the tubing and the casing, the check valve 83 will prevent the pressure fluid from contacting the producing formation 88, at any time.

To flow the well through the casing, the device shown in either Fig. 5 or Fig. 11 may be installed as for tubing flow, the check valve 83 being removed from the tubing. To start the flowing operation, close the pipe line 79, open the flow line 80, and admit pressure fluid through the tubing 77. This will cause the liquid in the tubing to become depressed to the level indicated at 92, and to upstand in the casing to the level at 93. The devices will function for casing flow in a manner so similar to the operation above described for tubing flow as to require no further explanation.

In Fig. 12, I show an intermitter similar to one of the embodiments in my co-pending application, Serial No. 242,773, filed November 28, 1938.

The pipe bracket 96, having the pressure gauge 97, supports the shell 99. The rods 102 join together the plates 101 and 108. The bracket 104, engaged about the tubing 77, supports the assembly in alignment with the tubing. The rods 107 are engaged with the brackets 104 and 114. The plate 101 is slidable over the upper nipple of the tubular bracket 96. The plate member 108 is secured upon the piston 103 by the set screw 117, and has an arm which supports the valve operating shell 99.

The valve 109 has an arm 109a adapted to open and close the valve by slight rotation. The cross pin 111 is secured through this arm and has its ends engaged within opposite spiral slots of the shell 110. When this shell is moved upward by the piston 103, due to pressure acting upon the piston from within the well, the spiral slots of the shell, co-acting with the pin 111, cause the valve 109 to open, and to close when the piston again moves downward.

The mechanical counter 116, actuated by the finger 108a of the plate member 108, will record the number of valve-opening movements.

When the pressure builds up in the casing or is built up to a pre-determined value through admission of pressure fluid from the line 79, the pressure fluid force acting through the tubular bracket 96, the openings 100a, 100b, of the oil retainer cup 100, and the opening 99a through a central depending boss of the shell 99, will contact the lower end of the piston 103 by acting on the lubricant 100c which follows under the piston and spring the lower latch 105 deriving its force from the spring 106; thereby opening the valve 109 by moving upwardly the spirals of the shell 110 over the arm 109 and the pin 111, as previously explained.

On the upstroke of the piston, the upper latch 112 engages by force of the spring 113.

The valve 109, being now open and the well flowing through the tubing 77, the pressure within the annular space 94 (see Fig. 13) between the tubing and the casing ordinarily will decrease after a pre-determined flowing period, or when the liquid head has been discharged and pressure fluid reaches the tubing intake nipple 84. When the pressure fluid becomes depleted to a pre-determined value, the spring 98 will spring the upper latch 112. The valve 109 will be then closed and the piston and other movable parts will return to the position shown in Fig. 12.

For casing flow, the intermitter assembly illustrated in Fig. 12 may be installed upon the casing and operated by controlled pressure from a pipe line.

It is understood that the details of construction and arrangement of parts are subject to many obvious variations and minor changes without departing from the scope and purpose of my invention as stated in the objects and as defined by the appended claims.

The invention claimed is:

1. A flow valve comprising a body having a passageway with an inlet and an outlet, a valve assembly movable within said passageway, said assembly including oppositely extending valve members, spaced opposed metering chambers in the passageway into which said valve members are adapted to move to produce progressive throttling action upon pressure fluid passing through the passageway under a differential pressure between the interior and exterior of the valve body, a valve seat posteriorly within each of the chambers, and adapted to be engaged by one of the valve members to close the passageway, means resiliently holding the valve assembly at a predetermined position within the passageway, and means for releasably latching the assembly in position when one of the valve members engages its co-operating valve seat.

2. A flow valve comprising a body having a passageway with an inlet and an outlet, a valve assembly movable within said passageway, said assembly including oppositely extending valve members with an axial bore therethrough, spaced opposed metering chambers in the passageway adapted to receive said valve members, each of said chambers comprising a bore having oppositely converging inner surfaces whereby fluid, passing through the passageway, is throttled during passage through one of the chambers, and means intermediate the metering chambers for normally holding the valve assembly with the valves in the entrances to the chambers.

3. A flow valve comprising a body having a passageway with an inlet and an outlet adjacent the opposite ends thereof, a valve assembly movable axially of the passageway, a metering chamber comprising an inwardly opening bore in each end of the passageway, a tubular member extending axially of the passageway, a tubular valve on each end of said member and adapted to enter one of said chambers, and resilient means normally holding the valve assembly with the valves in the entrances to the metering chambers.

4. A flow valve comprising a body having a passageway with an inlet and an outlet adjacent the opposite ends thereof, spaced walls in the passageway between the inlet and outlet, said walls having aligned openings therein, a metering chamber in each end of the passageway in alignment with said openings, a valve assembly movable axially of the passageway, said assembly comprising a tubular member passing through said openings and including oppositely extending valve members adapted to enter said chambers, a piston surrounding said tubular member, and a liquid filling the chamber intermediate said spaced walls, there being a restricted passage from one side of the piston to the other so that the movement of the valve assembly is damped.

5. A flow valve comprising a body having a passageway, a valve assembly movable within said passageway, opposed metering chambers in the passageway on opposite sides of the assembly, each of said metering chambers comprising an inwardly tapering bore having a valve seat at its inner end, oppositely extending valve members on said assembly adapted to enter either of said bores to throttle the passage of fluid therethrough and to engage the associated seat upon the creation of a predetermined differential pressure between the interior and exterior of the valve body, and means for releasably latching the assembly in position when the passageway is closed.

6. A flow valve compromising a body having a passageway with an inlet and an outlet, a valve assembly movable in said passageway and including oppositely extending valve members, opposed valve seats in the passageway adapted to be engaged by said valve members and close the passageway, a latch rod attached to said assembly and extending through one of said valve seats, a chamber into which said latch rod extends, spring means engaging said body and latch rod to resiliently hold the assembly in predetermined position, a peripheral groove on the latch rod, and latch means urged inwardly against the latch rod by said last mentioned means to engage and releasably latch the assembly in position when one of the valve members engages its associated valve seat.

7. A flow valve comprising a valve body having a passageway with an inlet and an outlet, a valve assembly movable axially of the passageway, said assembly including a tubular member having oppositely extending valve members, opposed valve seats adapted to be engaged by said members, means normally urging the assembly to a position to close the inlet, and an annular piston surrounding said tubular member and sealably engaging the walls of the passageway so that the valve assembly moves within the passageway in accordance with the differential pressure at the inlet and outlet.

8. A flow valve comprising a body having a passageway, opposed valve seats therein, a valve assembly movable within the passageway and including valve members adapted to engage said seats, a chamber in alignment with the passageway, a rod attached to the valve assembly and extending into said chamber, a piston on the rod, a liquid within the chamber, spring means within the chamber urging the piston assembly to a predetermined position, a restricted bypass about the piston whereby movement of the valve assembly is retarded, and a latch means within said chamber to releasably latch the valve assembly in position to close the passageway.

9. A flow valve comprising a valve body having a passageway with spaced inlet and outlet openings, spaced opposed metering chambers in said passageway, each of said chambers having a valve seat at its innermost end, said inlet opening communicating with one of said chambers, and a valve member movable axially of said passageway, an annular piston surrounding said valve member intermediate its ends, said member having oppositely extending valve seating surfaces adapted respectively to engage one of said valve seats, there being a passage through the valve member from the inlet side of the piston and terminating in the seating surface at the opposite end of the member.

10. A valve assembly comprising a valve member having ends of reduced diameter terminating in converging seating surfaces to cooperate converging metering walls and end seats in a valve chamber so that flow of fluid pressure through such chamber is metered, a latch rod secured to said assembly, a latch cooperable with said rod, and a spring adapted to urge said assembly to its closed position at one end of its travel and to impart force to said latch.

11. A valve assembly comprising a valve member having ends of reduced diameter terminating in converging seating surfaces to cooperate converging metering walls and end seats in a valve chamber so that flow of fluid pressure through such chamber is metered, a latch rod secured to said assembly, a latch cooperable with said rod, a spring adapted to urge said assembly to its closed position at each end of its travel and to impart force to said latch, and a lubricant within the chamber about said spring and latch.

12. A valve assembly comprising a valve member having ends of reduced diameter terminating in converging seating surfaces to cooperate converging metering walls and end seats in a valve chamber so that flow of fluid pressure through such chamber is metered, a latch rod secured to said assembly, a latch cooperable with said rod, a spring adapted to urge said assembly to its closed position at each end of its travel, and to impart force to said latch, and a viscous lubricant within the chamber about said latch whereby the movements of said valve assembly are controlled against the action of false differentials in said chamber.

13. A flow valve having a valve body and a shell, a valve assembly slidable axially in said shell, means on said valve assembly and in said shell for metering pressure fluid, an extension on said valve assembly engageable with a spring to normally urge said valve assembly to its extreme intaking position, latching means operable by said spring to resiliently urge said valve assembly to resist movement away from each of its extreme positions, and a viscous lubricant to delay all movements of said valve assembly.

14. A flow valve having a valve body and a shell, a valve seat member positioned in said shell so as to divide the interior of said shell into two chambers, a valve assembly having a passage therethrough for pressure fluid in one of said chambers, latching means in the other of said chambers, said means being adapted to resiliently urge said valve assembly to resist movement thereof from its extreme closed positions, a viscous lubricant in said other chamber to retard all movements of said valve assembly, a metering chamber at each end of said first chamber adapted to coact with the ends of said valve assembly in metering pressure fluid, and a valve seat in each of said metering chambers engageable by said assembly.

15. In a flow device having a nipple adapted to be connected into the tubing of a well, a shell on said nipple, pressure fluid metering and valve means in said shell, a spring-loaded latch cooperable with said valve means, and a viscous fluid in said shell to delay the movements of said valve means and cause the same to act responsive to approximately true differentials.

16. A metering valve assembly in combination with latching means and a viscous lubricant for causing said valve assembly to resist the force of false differentials acting upon said assembly, comprising a piston having a valve on each end thereof, said assembly and valves having an axial passage therethrough and a lateral opening through one of said valves, said opening communicating with said passage, said latching means comprising an extension secured to said valve assembly, a latch floor and a latch roof, latch balls contacting said extension, floor and roof, and a spring adapted to coact with said floor to cause said balls to resiliently engage within recesses formed around said rod, and said viscous fluid contained within a chamber of said shell to lubricate said latch and resist the force of false differentials acting upon said valve assembly.

ALEXANDER BOYNTON.